Dec. 19, 1967  J. P. SMYLY  3,359,133
CERAMIC DIELECTRICS
Filed April 6, 1964

INVENTOR.
JAMES P. SMYLY
BY
Carpenter, Abbott, Coulter & Kinney
ATTORNEYS

United States Patent Office 3,359,133
Patented Dec. 19, 1967

3,359,133
CERAMIC DIELECTRICS
James P. Smyly, Soddy, Tenn., assignor, by mesne assignments, to American Lava Corporation, Chattanooga, Tenn., a corporation of Tennessee
Filed Apr. 6, 1964, Ser. No. 357,478
9 Claims. (Cl. 117—227)

ABSTRACT OF THE DISCLOSURE

Ceramic dielectric bodies of composition including barium titanate, strontium titanate, barium stannate, barium zirconate, and either cerium oxide or lanthanum oxide, or both, with components being present in special percentage ranges to give specialized combination of electrical properties.

---

Figure 1:
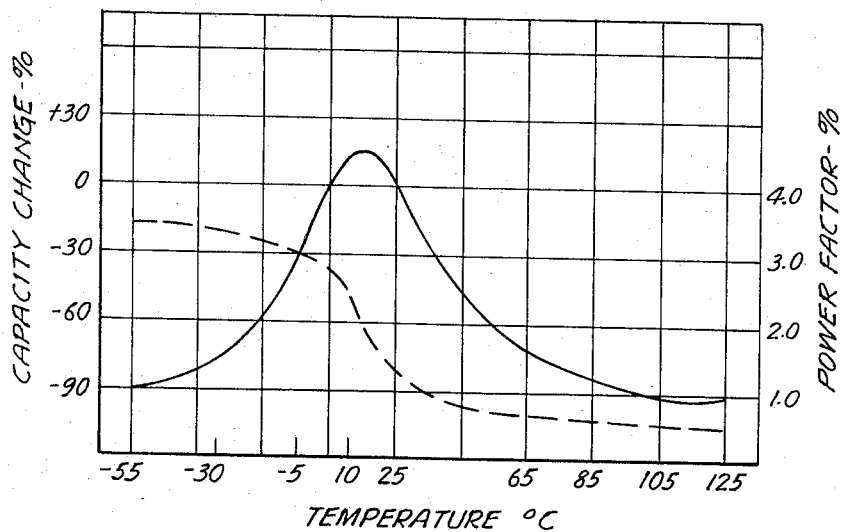

This invention relates to ceramic dielectric bodies.

More particularly, the invention is directed to ceramic dielectric bodies having high dielectric constants, in excess of 9,500 at room temperature, in combination with high dielectric breakdown strengths, low power factors, and other desirable properties as required for dielectric use. In essence, the invention provides new dielectric bodies which have high dielectric constants without sacrifice of other desired dielectric properties and even with improvement in other dielectric properties.

Preferred bodies of the invention have a relatively stable capacitance, or low capacitance change, at low voltage loads on the order of up to about 3 volts per mil. Such bodies, when electroded, form especially useful capacitors for transistor circuits. In such circuits, voltage loads varying up to about 9 or possibly 10 volts are easily accommodated by thin compact bodies of the invention about 3 mils thick, without significantly great variation in capacitance.

Further, electroded bodies within the teaching of the invention may exhibit great capacitance changes with minor voltage fluctuation. For example, an alternating current signal varying on the order of one or two volts, when superimposed over a biasing D.C. voltage of about 4½ volts per mil, may cause capacitance changes from about —5% to —40% based on the zero voltage (or an extremely low voltage) capacitance value. Those bodies within the invention which possess this unusually great voltage-sensitive characteristic are valuable for use as dielectric amplifiers.

Likely of greatest importance, however, is the fact that bodies of the present invention exhibit high and relatively stable dielectric constants (usually between 9,500 and about 16,000) under the voltage and temperature conditions (e.g., 15–30° C.) as customarily encountered in transistor circuit uses. Their dielectric breakdown strengths are so high that they withstand at least about 50 volts D.C. per mil of thickness at 85° C. for 1,000 hours without failure.

Generally, the insulation resistance of these bodies is at least 100,000 megohms, or high enough to give a resistance capacity product of at least 750 megohmmicrofarad. Their power factor will average about 1½ %, with a maximum value around 2%.

A further significant attribute of bodies of the invention is their resistance to capacitance change with time, i.e., their low aging rate. Bodies of the invention have a maximum decrease in capacitance with the passage of time of about 6% per hour decade.

When electroded with suitable conductive materials such as silver, platinum, palladium and the like, bodies of the invention are useful in a variety of solid state capacitor applications where a high capacitance is desired in a limited space. For example, they may be used as fluorescent light starter capacitors, as coupling and bypass capacitors, and in a number of other general purpose low-voltage capacitor applications. It is important to recognize that the bodies of the present invention possess properties as necessary for capacitors, and do not necessarily possess properties customary for semi-conductors of the usual type heretofore known.

Figure 2:
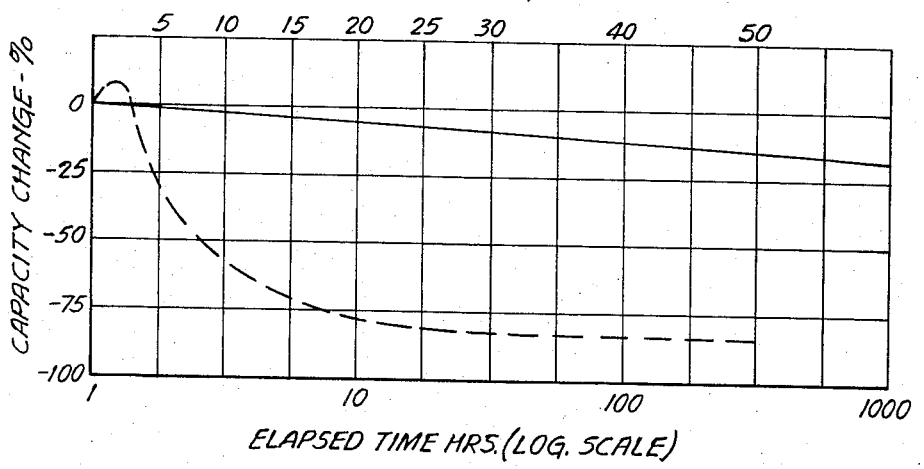

The invention will be described by reference to a drawing, made a part hereof, wherein FIGURES 1 and 2 are graphs, illustrating typical curves for the labeled properties of a capacitor formed by electroding a preferred body of the invention. In FIGURE 1, the solid line represents the curve for percent of capacitance change with changes in temperature, and the dash line represents the percent variation in power factor with changes in temperature. The solid line in FIGURE 2 represents a typical curve of the aging rate for bodies of the invention (i.e., percent of capacitance change with the passage of time), whereas the dash line in FIGURE 2 represents a typical curve for the percent of capacitance change with varying voltage. It should be observed that the voltage coefficient of capacitance generally decreases logarithmically with increase in D.C. voltage, but in a manner such that the capacitance is slightly positive or varies little when 2 to 3 volts D.C. per mil are applied, but drops to about 40% or so of the no voltage capacity when 10 volts D.C. per mil are applied and drops to an even lower figure of about 15% of the no voltage capacity when 35 volts D.C. per mil are applied.

Bodies of the invention, while containing a major proportion of barium titanate, also contain minor amounts of strontium titanate, barium stannate, and barium zirconate, together with an extremely small or doping quantity of cerium oxide. It is, however, possible to employ lanthanum oxid as a replacement for a part or all of the cerium oxide in the composition, although the effect of lanthanum oxide additions is not considered as fully advantageous as additions of cerium oxide. Both oxides enhance the attainment of high dielectric constants with high resistivity and improved life for the final bodies, but only limited amounts of one or the other or both are necessary and desirable for this result without significantly reducing high resistivity and other characteristics for the bodies as aforedelineated. Greater additions than about 1 mol percent for the total of the cerium oxide and lanthanum oxide tend to cause crystal changes of such significant magnitude in the fired bodies as to upset the attainment of the properties aforedelineated; and it is usually preferred not to exceed about 0.7 mol percent for these additions.

Generally, where cerium oxide is used, the preferred addition will not exceed about 0.33 mol percent of the fired end body. Indeed, best results are obtained when the addition of cerium oxide does not exceed 0.06 or 0.07 mol percent of the end body. When amounts of cerium oxide above about 0.06 or 0.07 up to about 1 mol percent are used, the conditions for firing the body to a ceramic state are preferably slightly oxidizing. In the case of lanthanum oxide, the preferred additions are between about 0.02 and 0.25 mol percent for most reliable duplication of results. However, even though some crystalline changes start to take place around the 0.25 mol percent addition, satisfactory results in terms of the end properties aforedelineated for the body have been obtained for addition of lanthanum oxide up to but no more than 1 mol percent. Ideal practical optimum additions for these oxides lie within about 0.04 and 0.06 mol percent. As a minimum, the addition of one or the other oxide, or both, should always be sufficient to account for at least about 0.01 mol percent of the fired end body.

The broad composition range found to give the results aforedelineated for the bodies hereof, and results for which the curves in the drawing are typical, is as follows:

|  | Mol percent |
|---|---|
| Barium titanate | 71 to 77 |
| Strontium titanate | 8 to 13 |
| Barium stannate | 6 to 10 |
| Barium zirconate | 5 to 9 |
| Barium stannate plus barium zirconate | 11 to 16 |
| Cerium oxide plus lanthanum oxide | 0.01 to 1.0 |

In addition, the ratio of barium stannate to barium zirconate should preferably not exceed 1.4.

The peak capacitance for bodies having the foregoing composition is at approximately room temperature, although slight adjustments of the quantity of barium titanate with respect to the quantity of strontium titanate may alter this peak for capacitance. Generally, as less barium titanate is used in relation to the strontium titanate, or more strontium titanate is used in relation to the barium titanate, within mol percent ranges aforenoted, the temperature at which peaking of dielectric constant occurs will be reduced to some extent (even to a temperature slightly below room temperature), whereas the reverse of such formula modifications will cause the temperature at which peaking occurs to rise slightly above room temperature.

Barium zirconate appears to contribute to the attainment of the curve for capacitance variation with voltage, as does barium stannate. Both act as Curie shifters. Barium stannate is necessary for the magnitude of the dielectric constant. Barium zirconate, however, does little for the dielectric constant; and therefore, while it is necessary for the total balance of properties attained in the final body, it is used sparingly. Generally, as these materials are increased, the peak for capacitance shifts toward a lower temperature.

It has been found preferable to employ barium titanate having a deficiency of baria as compared to a stoichiometric quantity. A deficiency of about 2 mol percent is quite suitable, but preferably the deficiency is about 2.65% to 2.9% (or even 3.0%) below that normally required for a stoichiometric quantity of baria for barium titanate.

In terms of individual metal oxides as distinguished from metal oxide complexes, the composition variations for bodies of the invention generally should fall within the following permissible ranges, which are approximations:

|  | Mol percent |
|---|---|
| Barium oxide | 52 to 61 |
| Strontium oxide | 4 to 8 |
| Titanium oxide | 27 to 33 |
| Stannous oxide | 2 to 5 |
| Zirconium oxide | 2 to 4 |
| Cerium oxide plus lanthanum oxide | 0.01 to 1.0 |

The following is offered to illustrate a preferred method for making bodies according to the invention.

| Starting material: | Parts by weight |
|---|---|
| Barium titanate (baria deficiency of 2.75%) | 74.50 |
| Strontium titanate | 11.50 |
| Barium stannate | 7.79 |
| Barium zirconate | 6.15 |
| Cerium hydrate | .06 |
|  | 100.00 |

The starting materials above may be collectively termed the "ceramic batch." To 100 parts of the ceramic batch is added about 1.5 parts by weight of a 20% water solution of polyvinyl alcohol, plus about 45 parts by weight of water. The ceramic batch as well as the just noted additions are placed in a ball mill containing flint balls and the material is milled for approximately 10 hours to insure intimate mixing as well as slight reduction of the average particle size of the different ingredients making up the ceramic batch. Following milling, the material is agitated while spray dried into small essentially uniform pellets or pills about $\frac{1}{32}$ inch to $\frac{1}{64}$ inch diameter (such that they pass a screen of approximately 40 mesh U.S. Standard). During spray drying, approximately 95% of the water is eliminated; and the resulting pellets are slightly moist with the particles of ceramic ingredients held together by the organic binder. The pellets are pressed into the shape of discs or other bodies of thickness as desired, usually 5 to 50 mils thick (although extremely thin articles of 1 or 2 or 3 mils may be formed), depending upon the final use application contemplated. Pressing is preferably accomplished to provide green articles having a density at least about 60% of their theoretical density. Then the pressed discs or other shapes are placed on refractory plates and fired. The firing cycle may vary from about 12 to 32 hours with the peak temperature of about 1400° C. maintained for approximately 2 hours at approximately the middle of the firing cycle.

The composition of fired ceramic bodies formed in accordance with the foregoing is essentially the same as the ceramic batch starting composition, although the cerium oxide content is about 0.05 mol percent as distinguished from a content of 0.06 for the starting cerium hydrate. In terms of individual oxides, fired bodies formed in accordance with the above have a composition as follows:

|  | Mol percent |
|---|---|
| Barium oxide | 56.40 |
| Strontium oxide | 6.49 |
| Titanium oxide | 30.50 |
| Stannous oxide | 3.80 |
| Zirconium oxide | 2.76 |
| Cerium oxide | .05 |
|  | 100.00 |

Following firing, capacitors may be formed by applying a silver paste and firing the paste at approximately 800° C. for about 3 to 5 minutes in a firing cycle involving about one hour to reach 800° C. and about ½ hour for cooling.

Discs electroded as above have been tested electrically and found to exhibit the characteristics set forth in the drawings appended hereto. A capacitor formed using a disc approximately 0.096 inch thick and approximately 0.382 inch in diameter was found to have a power factor of approximately 1.38, a capacitance of 0.031136 microfarad, a dielectric constant at room temperature (22° C.) of 11,529, and an insulation resistance of approximately 200,000 kilomegohms.

What is claimed is:

1. A ceramic dielectric body characterized by having a dielectric constant above 9,500 up to approximately 16,000 at room temperature, by having a maximum aging rate per hour decade less than about 6%, and by being capable of operation at 50 volts D.C. per mil at 85° C. for 1,000 hours without failure, said body being composed essentially of ingredients in mol percent as follows: barium titanate, 71 to 77; strontium titanate, 8 to 13; barium stannate, 6 to 10; barium zirconate, 5 to 9; a total quantity of barium stannate and barium zirconate between 11 and 16; with a ratio of barium stannate to barium zirconate no greater than 1.4; and a small but significant quantity, at least 0.01 mol percent but less than 0.7 mol percent, of one or more oxides selected from the group consisting of cerium oxide and lanthanum oxide.

2. The body of claim 1 in which the oxide is cerium oxide and is present in an amount no more than about 0.33 mol percent.

3. The body of claim 1 in which the oxide is lanthanum oxide and is present in an amount no more than about 0.25 mol percent.

4. The body of claim 1 in which the barium titanate has a baria deficiency up to about 3 mol percent below that required for a stoichiometric quantity of baria for barium titanate.

5. The body of claim 4 in which the oxide is cerium oxide.

6. The body of claim 5 in which the amount of cerium oxide is between 0.04 and 0.06 mol percent of the body.

7. The body of claim 4 in which the oxide is lanthanum oxide.

8. The body of claim 7 in which the amount of lanthanum oxide is between 0.04 and 0.06 mol percent of the body.

9. The body of claim 1 having at least one electrode of conductive material affixed thereto.

References Cited

UNITED STATES PATENTS

| | | | |
|---|---|---|---|
| 2,452,532 | 10/1948 | Wainer | 106—39 |
| 2,776,898 | 1/1957 | Day et al. | 106—39 |
| 2,985,700 | 5/1961 | Johnston | 106—39 |
| 3,035,927 | 5/1962 | Janulionis | 106—39 |
| 3,221,228 | 11/1965 | Carter et al. | 317—258 |
| 3,268,783 | 8/1966 | Saburi | 317—258 |

FOREIGN PATENTS 714,965  8/1954  Great Britain.

OTHER REFERENCES

Bradley: "What About Rare Earths," Ceramic Age, October 1957 (page 29).

Dungan et al.: "Lattice Constants and Dielectric Properties of Barium Titanate-Barium Stannate-Strontium Titanate Bodies," J. Amer. Ceramic Soc. (1952), pages 318–321.

MacChesney et al.: "Stabilized Barium Titanate Ceramics for Capacitor Dielectrics" J. Am. Cer. Soc., volume 46—May 1963 (pages 197–202).

Schray: "Effect of pH in the Chemical Preparation of Barium-Strontium Titanate," J. Amer. Cer. Soc. volume 48 (1965) page 404.

HELEN M. McCARTHY, *Primary Examiner.*